J. F. TAYLOR.
AUTOMOBILE DIRIGIBLE HEADLIGHT MOUNTING.
APPLICATION FILED JUNE 2, 1915.
1,150,234. Patented Aug. 17, 1915.
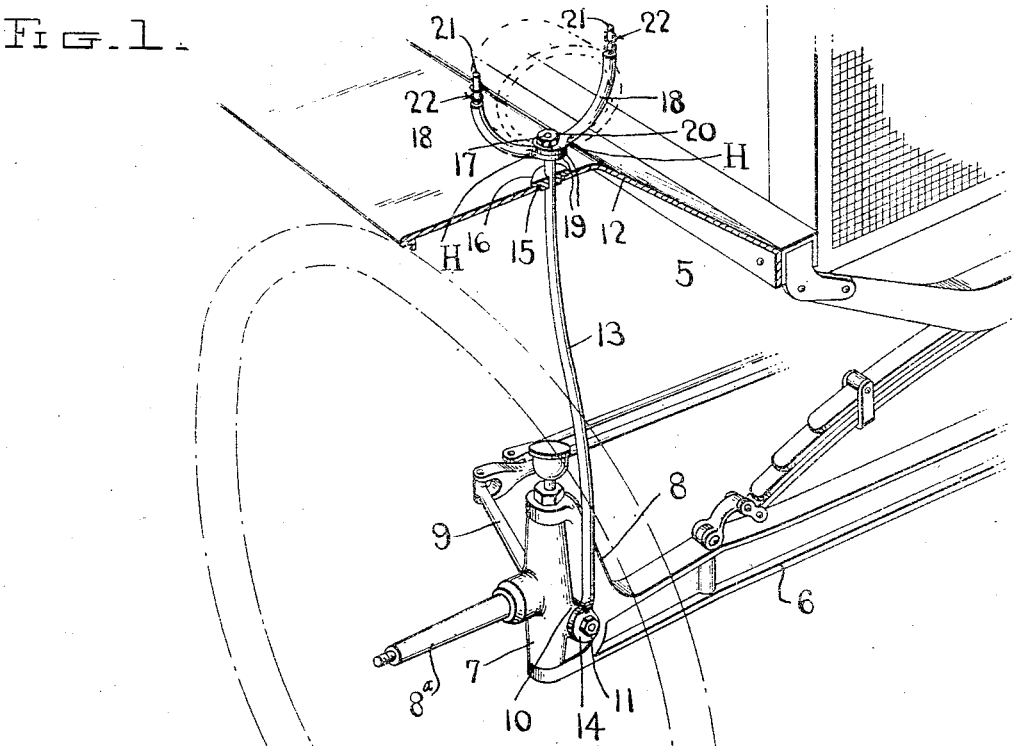
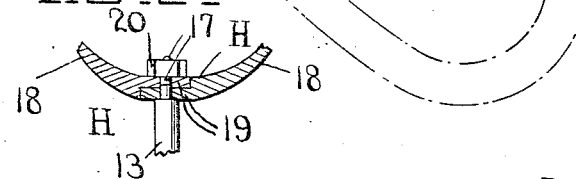
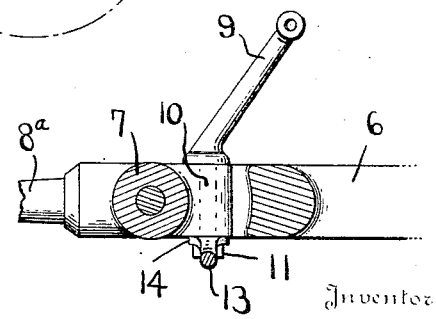
Inventor
James Frank Taylor
Attorney ized as UNITED STATES PATENT OFFICE.

JAMES FRANK TAYLOR, OF WASHINGTON, DISTRICT OF COLUMBIA.

AUTOMOBILE DIRIGIBLE-HEADLIGHT MOUNTING.

1,150,234.

Specification of Letters Patent. Patented Aug. 17, 1915.

Application filed June 2, 1915. Serial No. 31,679.

*To all whom it may concern:*

Be it known that I, JAMES FRANK TAYLOR, a citizen of the United States, residing at Washington, in the District of Columbia, have invented new and useful Improvements in Automobile Dirigible-Headlight Mountings, of which the following is a specification.

The present invention relates to means for supporting headlights on automobiles, so that the same will turn when the wheels are adjusted in order that the light projected ahead of the automobile will be kept on the roadway during such turns.

The primary object of the invention is to provide an exceedingly simple, and therefore inexpensive mounting of a novel character that can be readily applied by an inexperienced person without the necessity of materially modifying the automobile structure, and will constitute a proper support for the lamp while causing its movement with the adjustment of the wheels.

An embodiment of the invention that has proven entirely practicable is illustrated in the accompanying drawings, wherein:—

Figure 1 is a perspective view of a portion of an automobile, with parts thereof shown in section and illustrating the novel device in place thereon. Fig. 2 is a vertical sectional view through the upper portion of said device. Fig. 3 is a plan view. Fig. 4 is a horizontal sectional view through the steering knuckle.

Similar reference numerals designate corresponding parts in all the figures of the drawings.

In the embodiment illustrated, a portion of an automobile is shown and is generally designated 5. The same includes a front axle 6, on which is mounted a steering knuckle comprising a vertical hub 7 rotatably mounted in a bracket 8 formed upon the end of the axle 6 and having a wheel engaging spindle 8ᵃ. The steering knuckle also includes a rearwardly extending steering arm 9, which, as shown, passes through an enlargement 10 formed on the hub 7 and is held in place by a nut 11. A mud guard 12 is located over the steering knuckle and may be of any well known form.

The head-light mounting comprises an upstanding shaft member 13 preferably though not necessarily formed of a single rod having a lower transversely disposed terminal eye 14 that is engaged upon the projecting end of the steering arm 9 and is held in place by the nut 11 which secures the said arm 9. This shaft member 13 is preferably curved slightly so that it will not interfere with the turning of the knuckle, and so that its upper portion will project through the mud-guard 12 preferably in axial alinement with the said hub 7. An opening 15 is formed in the mud-guard 12 to permit the passage of this rod or shaft 13, and in order to prevent noise or rattle, a rubber gasket 16 is preferably placed in said opening around the said shaft.

The upper end of the shaft or rod 13 terminates in a reduced vertical stem 17 on which is mounted a lamp supporting yoke. Inasmuch as lamps vary considerably in form and size, this yoke is preferably made adjustable, and to this end it consists of a pair of upwardly curved arms 18 having terminal eyes 19 journaled upon the stem 17. These arms are normally held against rotatable movement by a nut 20 threaded upon the upper end of the stem and bearing upon the eyes. The arms 18 terminate in reduced portions 21 on which the lamp may be mounted, and if desired coiled springs 22 may be placed on said stems below the lamp for the purpose of assisting in absorbing the shocks.

It will be noted that this device is an exceedingly simple one and that it may be readily applied to practically any well known type of automobile. The only alteration necessary is the making of an opening through the mud-guard for the passage of the shaft. To secure it in place, it is only necessary to remove the nut 11, place the eye 14 on the projecting threaded end of the steering arm 9, and replace the nut. It will be understood that one of these may be employed for each steering wheel.

From the foregoing, it is thought that the construction, operation, and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a device of the character set forth, a shaft member having a transversely disposed terminal eye in its lower end adapted to be secured to the steering knuckle of an automobile alongside the same and in substantially vertical relation, and means on the upper end of the shaft member for mounting a lamp thereon in substantially longitudinal alinement with said shaft member.

2. The combination with an automobile having a mud guard and a steering knuckle, said knuckle including a vertical hub and a steering arm extending transversely thereof, of an upstanding shaft having an eye engaged by the steering arm, and said shaft being journaled in the mud guard, and a lamp holding bracket carried by the upper end of the shaft.

In testimony whereof I have hereunto set my hand in presence of two subscribing witnesses.

JAMES FRANK TAYLOR.